United States Patent [19]

Hampton et al.

[11] 3,836,376

[45] Sept. 17, 1974

[54] STARCH-BASED ADHESIVE COMPOSITIONS

[75] Inventors: Richard J. Hampton, Pierrefonds; Brian P. Bonnell, Greenfield Park, Quebec, both of Canada

[73] Assignee: The Ogilvie Flour Mills Company, Limited, Montreal, Quebec, Canada

[22] Filed: Dec. 4, 1972

[21] Appl. No.: 311,544

Related U.S. Application Data

[63] Continuation of Ser. No. 62,792, Aug. 11, 1970, abandoned.

[52] U.S. Cl................ 106/213, 127/33, 127/71, 260/17.3
[51] Int. Cl. .................... C08b 25/02, C08b 17/22
[58] Field of Search .......... 127/33, 71, 28; 106/213; 260/74, 17.3

[56] References Cited
UNITED STATES PATENTS

| | | | |
|---|---|---|---|
| 2,884,389 | 4/1959 | Corwin | 260/17.2 |
| 3,019,120 | 1/1962 | Bauer | 106/213 |
| 3,228,781 | 1/1966 | Halpert | 106/213 |
| 3,622,388 | 11/1971 | Larson | 106/213 |

*Primary Examiner*—Theodore Morris
*Attorney, Agent, or Firm*—Christen & Sabol

[57] ABSTRACT

A process for preparing and continuously delivering a finished starch-based adhesive composition, containing a gelatinized starch portion and a raw starch protein, to a site of use, such as a corrugating machine. The process includes continuously delivering formula components, including raw starch slurry, water and caustic, to an adjustable metering device by which means the volume of each component is precisely controlled to attain relative proportions of such components corresponding to a desired formula. Controlled volumes of raw starch slurry, water and caustic are delivered to a first mixing zone wherein the ingredients are heated to produce a gelatinized starch mass of relatively stable viscosity. The gelatinized mass is passed to a second mixing zone. A further volume of water is simultaneously forwarded to the second mixing zone. The gelatinized starch and water in the second mixing zone is blended to form a gelatinized starch medium. The gelatinized starch medium is passed from the second mixing to a third mixing zone. Simultaneously, a further volume of raw starch slurry is forwarded to the third mixing zone. The raw starch slurry is commingled with the gelatinized medium so as to intimately combine the two starch fractions - the gelatinized starch becomes a carrier to hold raw starch slurry in suspension thereby forming the finished starch-based adhesive composition. The finished starch-based adhesive is delivered to a container for temporary storage. When necessary there is further adjusting of the volumes through the metering device of one or more of the adhesive components relative to the other volumes thereby altering prior to use the relative proportions in the finished starch-based adhesive composition, to produce a correct formula. The finished starch-based adhesive composition is passed from the container to the site of use.

5 Claims, 1 Drawing Figure

PATENTED SEP 17 1974  3,836,376
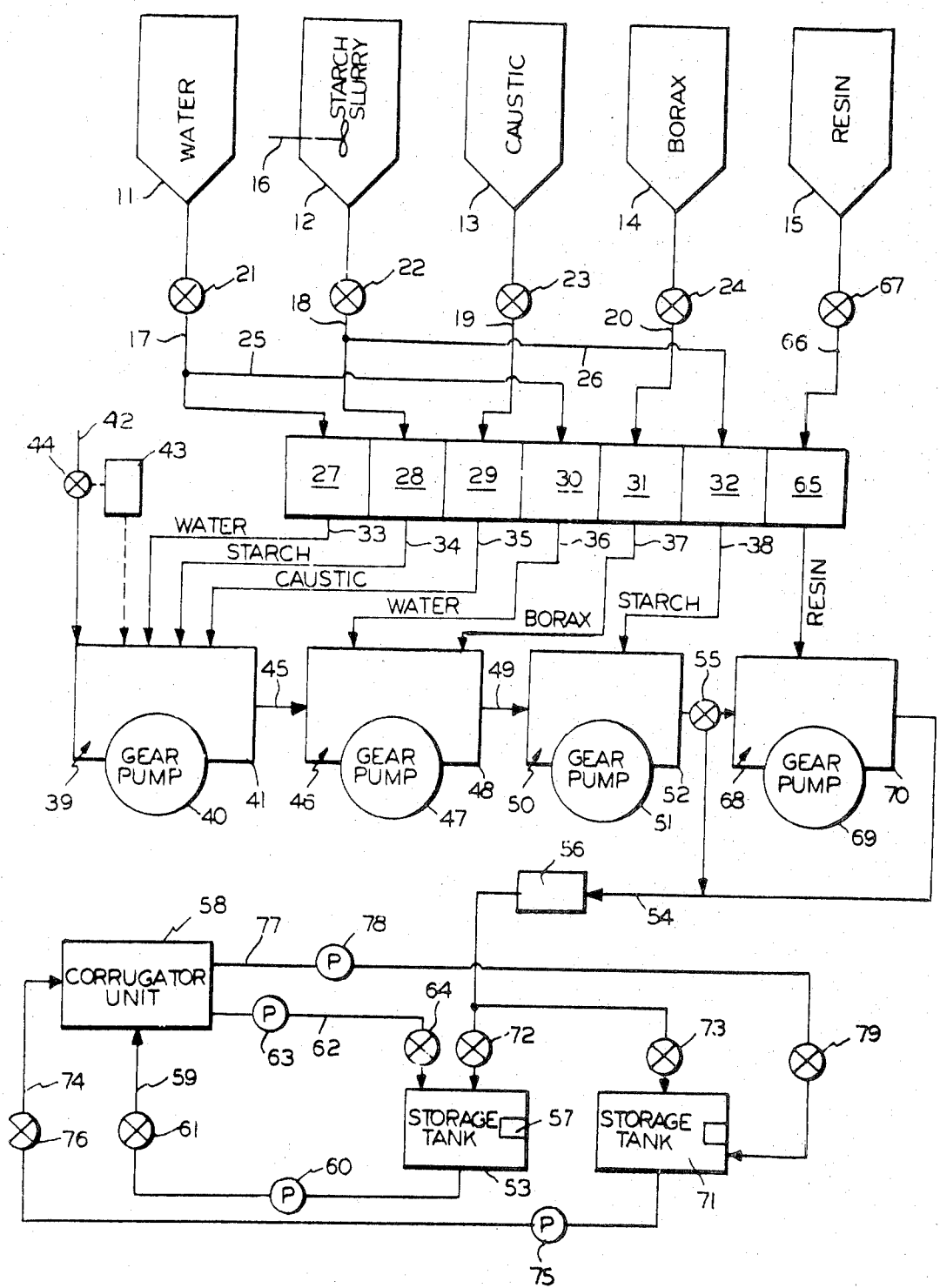

STARCH-BASED ADHESIVE COMPOSITIONS

This is a continuation of application Ser. No. 62,792, filed on Aug. 11, 1970 now abandoned.

This invention relates to a process and plant assembly for preparing starch-based compositions. More particularly, the invention is concerned with a continuous process for preparing starch-based adhesive compositions suitable for use in the manufacture of paperboard, such as corrugated paperboard, which comprises a gelatinised starch in minor proportion and an ungelatinised starch in major proportion, and a plant assembly for conducting this process.

At the present time, corrugated paperboard is manufactured in a continuous operation involving several steps. A strip of paper, slightly moistened, is passed through heated flute rolls. To one side of the heated fluted paper, adhesive is applied at the top edge of each flute. Immediately thereafter, the fluted paper is contacted, under heat and pressure, with a strip of liner paper to form a strong adhesive bond between the two layers. This product is known in the art as "single facer" corrugated paperboard. Another type of corrugated paperboard is the rigid sort used, for instance, in the fabrication of paper boxes. In forming this type of paperboard, additional adhesive is applied to the exposed, fluted tips in a further operation, and a second strip of liner paper is brought into contact with the fluted interlayer and bonded thereto, under heat and pressure, employing a double backer machine.

The successful production of corrugated paperboards in the high-speed machines (600 feet or more per minute) currently used is very sensitive to the properties of the adhesive. Thus, the viscosity of the adhesive, to give a satisfactory product, must be such that the adhesive flows readily in the equipment while being circulated to keep it uniform. Also the adhesive must be sufficiently viscous to remain in position on the tip of the flute when applied, and to fill any depressions inherently present in the paper. In addition, because of the high speed of present machines, it must be capable of "instant bonding" when heat and pressure are applied.

Starches of different types have been extensively used for many years as the heat-setting adhesive in the manufacture of corrugated and other sorts of paperboard. Conventionally, these starch adhesives consist of two fractions, one called the primary or carrier fraction, the other the secondary fraction. The primary fraction contains cooked, i.e., gelatinised, starch which serves as the suspension medium or carrier for the raw starch of the secondary fraction. The two fractions are normally prepared in separate containers and then mixed together. For example, the carrier starch is usually cooked at relatively high temperatures in the presence of alkali, while the secondary starch is prepared in a separate container by mixing an aqueous slurry of raw, i.e., uncooked, starch, with borax at a temperature below the gelatinisation temperature. The cooked starch is then added to, and thoroughly mixed with, the raw starch slurry with the cooked starch serving as a suspension medium for the raw starch portion, thereby providing a relatively viscous adhesive starch paste. Current practice in the industry is to produce such a paste by a batch operation wherein the two starch fractions are blended together in a batch mixer, typically around 6,000 lbs. capacity, and the paste so-obtained conveyed to storage tanks, in which the starch is stored until required which may be anything up to 48 hours. During this period, the raw starch fraction of the paste is maintained in suspension by continuous agitation.

The preparation of large batch quantities of adhesive well in advance of use in this way is attended by, and associated with, several disadvantages. Thus, extensive storage facilities are required in order to accommodate the batches. Also, the batch system inherently lacks flexibility, in that for different grades of paperboard which usually will require different adhesive formulations, a fresh batch has to be prepared. Moreover, the viscosity of the prepared starch paste, especially the cooked or gelatinised portion is adversely affected during the storage as a consequence of the requirment for continuous agitation. This agitation results in shearing of the starch paste, and this shearing reacts adversely on the viscosity, especially of the carrier starch fraction. Further, since the production and supply of starch paste in the batch process is not immediately or directly tailored to the corrugating machinery requirements, it generally is necessary to recycle excess adhesive from the site of use to the storage tank. Indeed, when large quantities of adhesive starch paste are in storage, there is a continual long term cycling of the paste from storage to site of use, and back to storage. This excess adhesive has been subjected at the site of use to considerable shearing with a correspondingly adverse effect on the viscosity thereof. Accordingly, this adhesive, when reintroduced into the storage tank contributes toward breakdown in the viscosity of the adhesive starch paste. In short, with the batch process for making adhesive starch pastes, difficulties are often experienced in maintaining a uniform viscosity which, as previously explained, is desirable for satisfactory results, especially when the adhesive is employed in high speed corrugating machinery.

An object of this invention is to provide a novel process for making starch adhesive pastes primarily for use in the corrugated paperboard industry wherein (a) the cooking and blending operations are conducted on a continuous basis integrated with the adhesive requirements of the corrugating machinery; and (b) the several components of the finished adhesive paste are blended together in predetermined amounts directly related to the adhesive requirements of the corrugating machinery and desired composition of the finished paste. In this way, long periods of storage of the prepared adhesive are avoided with the result that there is a reduced tendency for viscosity breakdown in the adhesive paste to the end that substantially optimum viscosity is maintained until use. Further, the composition of the finished adhesive paste can be readily varied, say, to suit different grades of corrugated paperboard, simply by altering the amounts of the various components blended together in the process.

A further object of this invention is to provide a plant assembly for conducting the novel process.

Accordingly, this invention, in one of its aspects, provides a process for preparing and continuously delivering a finished starch-based adhesive composition to a site of use, such as a corrugating machine, which comprises: delivering controlled and predetermined volumes of a starch slurry, water and caustic to a first mixing zone wherein the ingredients are heated to produce a gelatinised starch mass of relatively stable viscosity; passing said gelatinised mass to a second mixing zone; simultaneously forwarding to the second mixing zone controlled and predetermined volumes of water, and desirably borax; blending the gelatinised starch, water and, if present, borax in said second mixing zone; passing the gelatinised starch medium from the second mixing zone to a third mixing zone; simultaneously forwarding to said third mixing zone controlled and predetermined volumes of a raw starch slurry, commingling the raw starch slurry with the gelatinised starch medium to intimately combine the two starch fractions wherein the gelatinised starch becomes a carrier to hold said raw starch slurry in suspension; delivering the finished starch-based adhesive to a container for relatively temporary storage; and flowing said finished starch-based adhesive composition from the container to the site of use.

In a modified process according to this invention providing for the preparation of a waterproof or water resistant starch-based adhesive composition, the starch paste from the third mixing zone may be forwarded to a further mixing zone wherein it is blended with a preformed resin such, for example, as urea-formaldehyde, melamine-formaldehyde, resorcinol-formaldehyde, dimethylol-urea and the like. Alternatively, such a resin may be formed in situ by incorporating one monomer, for instance, formaldehyde, in one mixing zone and the other, for instance, resorcinol, in a subsequent mixing zone wherein polymerisation with formation of the resin is effected.

In order to gelatinise the starch granules in the first mixing zone, the aqueous starch slurry should be heated to a temperature of between about 70° to about 220°F, preferably between about 130° to about 200°F. Conveniently, steam is used to heat the aqueous starch slurry in the first mixing zone. In the second mixing zone, the gelatinised starch slurry from the preceding zone is cooled, say, to a temperature of between about 100° to about 160°F, by admixture with water and desirably also borax. Borax is an advantageous ingredient since it enhances the adhesive character of the finished paste as used at the machine and helps to buffer the caustic present in the formulation thereby serving to control the viscosity. Also, the presence of borax elevates the viscosity, and enhances the water retaining properties of the adhesive. Accordingly, borax is preferably incorporated in the starch slurry.

In a preferred embodiment according to this invention, one or more positive displacement metering pumps of adjustable throughput is used to deliver controlled and predetermined volumes of the various adhesive components to the several mixing zones. Also, in this preferred embodiment, the mixing action in the various zones is accomplished by a rotary pump, conveniently an internal gear or spur gear pump, equipped with a bypass circulating loop in which the components can be introduced and/or the blending effected.

The following description which is to be read in conjunction with the single FIGURE of the accompanying drawing will facilitate a better and more comprehensive understanding of this invention, and how it may be put into effect. The FIGURE itself is a flow diagram illustrating processes and plant assembly for making regular adhesive starch pastes and waterproof adhesive starch pastes.

The process for preparing regular adhesive starch pastes will be considered first. Referring to the FIGURE, tanks 11, 12, 13 and 14 contain water at ambient temperature, an aqueous slurry of starch, a sodium hydroxide solution and a borax solution respectively. The starch slurry is readily prepared by mixing the desired amount of raw, i.e. uncooked, starch with cold or warm water and the resultant suspension of the required solids content, gently agitated by stirrer 16. So long as the suspension remains in the uncooked or raw state the mechanical agitation will cause no adverse effects. The tanks may vary fairly widely in capacity but, by way of exemplification, the water holding tank 11, the starch slurry tank 12, the caustic tank 13 and the borax tank 14 have capacities of between about 500 and about 1,000 gallons, 500 and about 1,000 gallons, 50 and about 100 gallons, and 200 and about 500 gallons respectively.

Leading from each of tanks 11, 12, 13 and 14 is a line 17, 18, 19 and 20 respectively. Disposed in each of these lines is a valve 21, 22, 23 and 24 respectively, each of which may be automatically opened and closed. Lines 17 and 18 have branch extensions 25 and 26 beyond the valves. Included in each of lines 17, 18, 19, 20, 25 and 26 is a metering device 27, 28, 29, 31, 30 and 32 respectively, each of which devices can be regulated, if desired, automatically, to deliver a precise volume of the appropriate component from the appropriate storage tank. The metering device may take the form of a single head metering pump with a separate drive located in each individual line, or a multiple head metering pump with one head for each line energised and de-energised by a single drive unit.

Leading from each of the six metering devices 27 to 32 is a line 33 to 38 respectively.

Lines 33, 34 and 35 enter the first mixing zone 39. In this instance, the mixing zone is defined by an automatically controlled rotary pump 40 equipped with a bypass circulating loop 41 with which the lines 33 to 35 and line 42 carrying steam (normal factory steam at a pressure of 100 p.s.i.g., i.e., at a temperature of around 340°F is satisfactory) junction. The three lines 33 to 35 introducing the components of the starch slurry junction with the loop upstream of the steam line 42. Included in the loop 41 is a temperature controller 43, which automatically monitors the temperature of the slurry circulating in the loop. Included in the steam line 42 is a flow control valve 44 which regulates the flow of steam entering the mixing zone automatically in response to the temperature sensing device, i.e., controller, (for example, a liquid filled thermometer or a thermocouple) 43 to which it is operatively connected (not shown). In this mixing zone, the starch, caustic and water are intimately blended, primarily as a result of the turbulence in the bypass loop, to form an aqueous starch slurry. Moreover, the starch granules in the aqueous slurry are rapidly cooked and gelatinised by contact with the steam, which heats the slurry to a temperature of between about 70° and about 220° F, preferably between about 130° and about 200°F. The residence time in this zone varies depending, for instance, on the volume of components fed into the zone, the capacity of the pump, the dimensions of the loop and the temperature of the steam. It may, for example, be between about 5 and about 60 seconds, with a high recirculation rate, for instance, in the order of between about 10:1 and about 20:1.

From the mixing zone 39, line 45 leads to a second mixing zone 46 again comprising an automatically controlled rotary pump 47 and a bypass circulating loop 48. Water and borax are admitted to this loop, toward the upstream side, through lines 36 and 37 respectively each leading from the corresponding metering device 30 and 31. In this mixing zone, the carrier starch slurry, admitted at a temperature, say, of between about 130° and 200°F is blended with controlled and predetermined volumes of borax and water, the latter serving to cool the slurry, say, to a temperature of between about 100° and about 160°F. The residence time in this zone needed to ensure satisfactory blending and to cool to the desired temperature, may vary over fairly wide limits. However, by way of illustration, residence times of between about 5 and 60 seconds, with a recirculation rate of between about 10:1 and about 20:1 are usually satisfactory.

From the mixing zone 46, line 49 leads to a third mixing zone 50, again comprising an automatically controlled rotary pump 51 and a bypass circulating loop 52. The secondary starch slurry is admitted to this loop, toward the upstream side thereof, through line 38 leading from the metering device 32 which delivers a controlled and predetermined volume of the starch slurry from tank 12. In this mixing zone, the desired volume of carrier starch slurry at a suitable temperature is thoroughly mixed with the desired volume of secondary starch slurry to provide an adhesive starch paste in which the carrier starch slurry maintains the secondary starch slurry in suspension. Again, residence time in this mixing zone may vary widely but between about 5 and about 60 seconds, with a recirculation rate of between about 10:1 and about 20:1 is satisfactory in many instances.

Thereafter, the adhesive starch paste from the mixing zone 50, is delivered to a storage or surge tank 53 via valve controlled line 54. When valve 55 in line 54 is closed, the adhesive starch paste is prevented from flowing into the surge tank 53. If desired, line 54 may include an in-line mixer, for instance, a turbine mixer or colloid mill 56 to shear down the viscosity of the adhesive starch paste to the appropriate level for use directly in the corrugating machine. Conveniently, the storage tank 53 has an adhesive starch capacity of between about 100 and about 200 gallons, a quantity of adhesive starch paste that can be used in a relatively short period of time, and before pumping and circulating can adversely affect the viscosity of the starch paste.

If desired, the storage tank 53 can be equipped with a liquid level controller 57 which is operatively connected to (not shown), thereby energising, the aforementioned automatic pumps and opening the aforementioned automatic valves, when the level of adhesive starch paste in the tank falls below a preselected volume, and de-energising the aforementioned automatic pumps and closing the aforementioned automatic valves when the adhesive within the storage tanks rises to a preselected level indicating the quantity of adhesive that can be used before occurrence of viscosity breakdown. As can be seen, such a controller 57 can serve to control the delivery of the various components to the mixing zones and, ultimately, tha automatic delivery of the adhesive starch paste to the tank 53. Alternatively, the start-up and shut-down of the system can be controlled manually.

Storage tank 53 is connected to a corrugator unit 58 by a line 59 which has a pump 60 and a valve 61 interposed therein, and through this line the adhesive starch paste in the storage tank flows to the corrugator unit wherein the different paper sheets are bonded together as heretofore described.

Corrugator unit 58 is operated continuously and therefore a continuous supply of adhesive is delivered thereto. Provision is made for returning excess starch adhesive paste flowing out of the pan (not shown) in the corrugator unit through line 62 connected to the storage tank 53. Disposed in line 62 is a pump 63 and a valve 64.

A summary of the operation of the foregoing plant assembly follows: When the level of the adhesive starch paste in the storage tank 53 falls below the predetermined level, the metering devices 27 to 32 and the rotary pumps 40, 47, 51 and 60 are energised and the various valves in the system opened. This may be done manually or, in response to a liquid level controller located in the storage tank, automatically. Thus, a predetermined volume of starch slurry delivered by metering device 28 from tank 12 is admitted to the first mixing zone 39, along with predetermined volumes of caustic solution and water delivered by metering devices 29 and 27 from tanks 13 and 11 respectively. In addition, steam is admitted to this zone through the steam line 42. This steam rapidly cooks or gelatinises the starch granules in the aqueous slurry circulated by the rotary pump 40 in the bypass loop 41. When the temperature of the slurry rises above a preselected value, say, 170°F, the temperature sensing device 43 through a proportional controller (not shown) automatically actuates the flow control valve 44 so as to reduce the amount of steam admitted to the zone. Conversely, when the temperature falls below the preselected value the flow control valve is activated so as to admit more steam to cook the starch and bring the temperature up to the desired value. From the mixing zone 39, the carrier starch slurry continuously passes to the second mixing zone 46 in which it is both blended with, and cooled by, predetermined volumes of water and borax solution delivered by metering devices 30 and 31 from tanks 11 and 14 respectively. Thereafter, the cooled carrier starch is passed to the third mixing zone 50 wherein it is thoroughly mixed with a predetermined volume of a starch slurry (secondary starch slurry) delivered by metering device 32 from tank 12. The adhesive starch paste, comprising the secondary starch slurry suspended in the carrier starch slurry medium, is then delivered to storage tank 53.

Since the corrugator unit 58 is continuously operating, the adhesive starch paste in the storage tank is rapidly delivered to the unit and consumed. Any excess starch paste not used at once by the corrugator unit, overflows the pan in the unit and is returned to storage tank 53 via line 62 which has disposed therein a pump 63 and a valve 64 energised and opened respectively when the system is operating.

Typically, the hourly consumption of the adhesive starch paste is between about 50 and about 150 gallons, and since the capacity of the storage tank is between about 100 and about 200 gallons, the paste in the storage tank 53 is consumed well before viscosity breakdown occurs.

When the level of prepared adhesive starch paste rises in the storage tank above the preselected level, the aforementioned metering devices and pumps are de-energised and the various valves in the lines closed, and again this may be done manually or, in conjunction with a liquid level controller, automatically.

From the foregoing description, it will be appreciated that while the raw starch slurry is in tank 12 it is not vulnerable to the mechanical treatment imposed thereon by the agitation, and the carrier starch slurry is gelatinised only when the supply of prepared starch adhesive in the storage tank 53 falls below a preselected level, and that after the carrier starch is gelatinised it is used well before viscosity breakdown occurs. In this way, by avoiding or minimising the adverse effects associated with the preparation of large batches of starch paste well in advance of use, and instead, preparing automatically and essentially continuously relatively small quantities of adhesive starch paste, the uniform viscosity of the paste can be maintained until used.

To prepare a water-resistant adhesive, the foregoing plant assembly may be modified by the inclusion of a further storage tank 15, a further metering device 65 connected thereto by a line 66 which includes therein an automatic valve 67, and a further mixing zone 68. As before, the mixing zone comprises a rotary pump 69 and a bypass circulating loop 70. If desired, an additional storage tank 71 may be provided for the water-resistant adhesive. In this event, automatic valves 72 and 73 should be located in the line 54 immediately before the storage tanks 53 and 71 respectively. In this way, by closing valve 73, and opening valve 72, the regular adhesive is prevented from flowing into the water-resistant adhesive storage tank. Conversely, when preparing a water-resistant adhesive, by closing valve 72 and opening valve 73, the adhesive is prevented from flowing into the regular adhesive starch storage tank 53. The storage tank 71 is connected to the corrugator unit 58 by a line 74 having a pump 75 and a valve 76 interposed therein, and through this line the water-resistant adhesive starch paste in the storage tank flows to the corrugator. Excess adhesive not immediately used by the corrugator unit is returned to tank 71 by pump 78 via line 77 and through valve 79.

The process for preparing the water-resistant adhesive starch paste using this plant assembly is substantially the same as that for the regular adhesive paste with the exception that the adhesive starch paste from the third mixing zone is forwarded to a fourth mixing zone wherein it is thoroughly mixed with a predetermined volume of the selected resin. This resin is delivered by metering device 65 from storage tank 15.

A suitable metering device for use in this invention is provided by a Centurion 100 pump available from F.A. Hughes & Co. Limited, Epsom, Surrey, England. This is a variable stroke piston type pump in which four pump heads, i.e., four individual metering devices, are powered from a single drive unit so that in the event of motor failure all lines are shut down simultaneously. A given pump head, depending upon the bore thereof, has a capacity of 6.3, 10, 15.5, 25, 39.5 or 63 U.S. gal./hr., so that for a particular line 17 to 20, 25 to 26 and 66, a pump head is selected of a capacity that can match the desired operating throughput. Additionally, the individual output from each head is continuously variable through adjustment of the stroke length between 0 and the rated capacity of the head. Control over the stroke length may be effected manually or automatically (for example, pneumatically), and the particular stroke setting is indicated on a micrometer scale which reads digitally in percentage of full stroke which permits a reset accuracy of about 0.1 percent of full scale. Accordingly, the use of such a pump permits the precise metering of the liquid constituent materials into the several mixing zones in proper sequence. The proportions of the different materials metered into the mixing zones, as indicated on the micrometer scale, are predetermined in accordance with the desired formula for the finished adhesive starch paste. In practice, the operator simply sets the dials on the pump heads to correspond to the desired formula (these formula may be expressed as a series of eight numbers set on the pump dials). In the event the finished adhesive is not performing as expected, say, because the viscosity is not as desired, the formula can be readily altered simply by resetting one or more dials.

In one process according to this invention given by way of illustration only, in which a water-resistant adhesive is produced, the flow rates for the liquid materials in the various lines, and the capacities of the pump heads associated therewith, are as follows:

| Line | Material | | Flow Rate | Pump Head Capacity | |
|------|----------|--------|-----------|--------------------|---|
|      |          |        | (g.p.h.)  | (g.p.h.)           |   |
| 17   | Water    |        | 36.0      | 39.5               |   |
| 18   | Starch   | (30%)  | 18.0      | 25                 |   |
| 19   | Caustic  | (50%)  | 1.08      | 6.3                |   |
| 25   | Water    |        | 39.0      | 63                 |   |
| 20   | Borax    | (10%)  | 4.5       | 6.3                |   |
| 26   | Starch   |        | 78.0      | 39.5 ⎫<br>63 ⎭ | 2 pump heads |
| 66   | Soluble Resin | (65%) | 1.44  | 6.3                |   |
| 42   | Steam    |        | 7         | .2 —               |   |
|      | Total Flow |      | 185.22    |                    |   |

In this instance, therefore, to handle the seven streams passing through the metering devices, two four-headed Centurion pumps are needed, one pump to deal with lines 17 to 19 and 25, and one to deal with lines 20, 26 (two heads) and 66.

The viscosity of the finished adhesive can be checked simply by sampling the outlet line and determining the viscosity with a Bauer funnel in the conventional way. Alternatively, an automatic recording viscometer may be connected to the storage tanks 53 and 71 and, if desired, operatively connected (not shown) to the metering devices. Thus, by setting the viscosity controller to the desired optimum viscosity for the finished adhesive, when the viscosity deviates from this value, the metering devices may be manually or automatically adjusted to produce a corrected formula.

Preferred rotary pumps for use in the mixing zones are positive displacement, internal or spur gear pumps which, since the flow therefrom is constant, will level out any pulsations induced by the metering pumps and ensure, through the turbulence generated in the bypass circulating loops, positive and continuous mixing of a heavy, viscous slurry and paste. A suitable gear pump is the internal gear pump, commonly referred to as the Viking Gear Pump available from Viking Pump Co. of Canada, Windsor, Ontario.

In practising the process of this invention, the following sequence of steps are usually involved.

i. Preparation of the starch slurry of the desired solids content, for instance, 30 percent, and the caustic and borax solutions at the desired concentration, for example, 50 percent sodium hydroxide and 5 or 10 percent borax. The relative proportions of the starch:water:caustic:borax, and optionally resin, are dependent upon the desired characteristics of the finished adhesive. For instance, the ratio of starch to alkali to water blended together in the first mixing zone varies according to the temperature selected for the reaction; likewise the ratio in which the carrier starch slurry and the secondary starch slurry are blended together in the third mixing zone varies depending on the desired adhesive properties. It is presently known by those skilled in the art how to vary the concentration and proportions of constituents and the reaction temperature in order to obtain a satisfactory paste.

As for the starch which may be employed in this process, in general, any commercially available starch is suitable. Examples include corn starch, wheat starch, tapioca starch and the like, and chemically modified ungelatinised starches such as acid-modified and oxidised starches and chemical derivatives of starch such as the starch ethers described in our co-pending United States application, Ser. No. 413,894 filed Nov. 25, 1964. As for the caustic, the preferred material, on economic grounds, is sodium hydroxide, but other alkaline materials such, for example, as potassium hydroxide may be employed, and the term "caustic" as used herein is to be interpreted in this sense.

ii. Dialling the desired formulation on the metering pump heads.
  iii. Automatic temperature control governing steam admisstion in the first mixing zone.

Significant features relating to this continuous process as applied to the production of corrugating adhesives are as follows:

1. Labour Reduction

The process permits the corrugating machine operator to prepare his own adhesive by simply dialling a formulation according to prepared instructions and pressing the start buttons. Start-up and shut-down can be automated, as described, by a level controller in the storage tanks. The preparation of the starch slurry, and the caustic and borax solutions are simple jobs which can be performed once per shift by other labour personnel.

2. Storage Reduction

Inventories of prepared adhesive can be essentially eliminated since adhesive production can be adjusted and regulated to match consumption on a continuous basis. This feature is very significant when adhesive properties change during storage which is particularly marked in the case of water resistant adhesives, but also occurs with regular adhesives.

3. Formula Flexibility

Continuous adhesive production to match consumption without inventory build-up permits the corrugator to custom manufacture his adhesive formula to suit the particular paperboard being made. When the liner board or medium is changed to a different grade the operator can simply dial a new formula specific to that board. Single face or double face formula can be run consecutively to permit variation in adhesive quality between these two glue application points. Water resistant formulations can be produced for short runs on short notice.

4. Simplicity

The process incorporates a high level of mechanical reliability consistant with a simple control procedure such that a minimum of operator attention or mechanical maintenance is required.

What is claimed is:

1. A process for preparing and continuously delivering a finished starch-based adhesive composition, containing a gelatinized starch portion and a raw starch protein, to a site of use, such as a corrugating machine, which comprises:
   a. continuously delivering formula components, including raw starch slurry, water and caustic, to an adjustable metering device by which means the volume of each component is precisely controlled to attain relative proportions of said components corresponding to a desired formula:
   b. delivering said controlled volumes of raw starch slurry, water and caustic to a first mixing zone wherein the ingredients are heated to produce a gelatinized starch mass of relatively stable viscosity:
   c. passing said gelatinized mass to a second mixing zone;
   d. simultaneously with step (b), forwarding a further volume of water to said second mixing zone;
   e. blending the gelatinized starch and water in said second mixing zone to form a gelatinized starch medium;
   f. passing said gelatinized starch medium from said second mixing to a third mixing zone;
   g. simultaneously with step (f), forwarding a further volume of raw starch slurry to said third mixing zone, said raw starch slurry being commingled with said gelatinized medium to intimately combine the two starch fractions wherein the gelatinized starch becomes a carrier to hold raw starch slurry in suspension thereby forming said finished starch-based adhesive composition;
   h. delivering said finished starch-based adhesive to a container for temporary storage, and when necessary, further adjusting the volumes through the metering device of one or more of the adhesive components relative to the other volumes thereby altering prior to use the relative proportions in said finished starch-based adhesive composition, to produce a correct formula; and
   i. flowing said finished starch-based adhesive composition from said container to the site of use.

2. A process as claimed in claim 1 wherein a controlled volume of borax is introduced into said second zone along with said water.

3. A process as claimed in claim 1 for the preparation of a waterproof or water resistant starch-based adhesive composition in which the starch paste from the third mixing zone is forwarded to a further mixing zone wherein it is blended with a suitable resin.

4. A process as claimed in claim 2 wherein said resin is urea-formaldehyde, melamine-formaldehyde, resorcinol-formaldehyde or dimethylol-urea.

5. A process as claimed in claim 1 wherein the step of continuously delivering controlled volume of formula components to several mixing zones includes using positive displacement metering pumps of adjustable throughput, each pump being equipped with a by-pass circulating loop in which the components can be introduced, whereby flowing and blending of the components is effected.

* * * * *